July 12, 1932.                    C. F. H. BOHNHARDT                    1,867,204
                                   LIQUID LEVEL GAUGE
                                   Filed Dec. 5, 1928
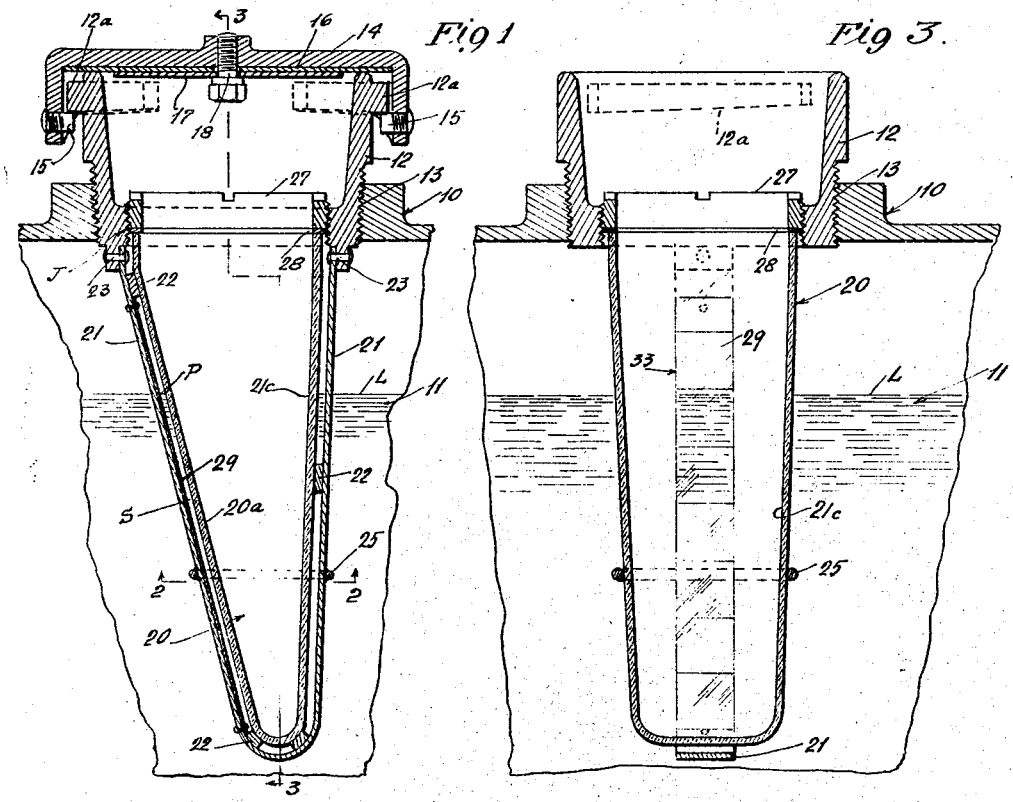
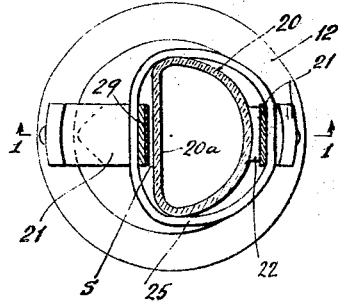
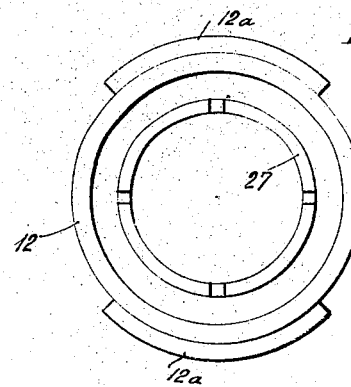
Inventor.
Charles. F. H. Bohnhardt.
Attorney.

73. MEASURING AND TESTING.

Patented July 12, 1932

1,867,204

UNITED STATES PATENT OFFICE

CHARLES F. H. BOHNHARDT, OF LYNWOOD, CALIFORNIA, ASSIGNOR TO JULIAN A. CAMPBELL, OF LONG BEACH, CALIFORNIA

LIQUID LEVEL GAUGE

Application filed December 5, 1928. Serial No. 324,039.

The present invention has to do generally with liquid level gauges, and relates more particularly to a tank gauge of this character whereby the liquid level in tanks containing petroleum distillate, or the like, may be determined by looking through the top closure of the tank and normal to the surface of the liquid.

In the handling of volatile liquids, such as gasoline, in tank lots, it is customary not to completely fill the tanks, but to provide for a vapor space between the top thereof and the surface of the liquid, reasons for which are well known to those experienced in handling materials of this character. Such tanks usually are filled by way of a delivery line inserted through an opening in the top of the tank, the amount of liquid in the tank being observed by an attendant who discontinues the filling operations when the liquid level reaches a predetermined point. It is therefore desirable that the attendant be enabled to observe the liquid level by a gauge device located on top of the tank and at a point somewhat near the place of filling.

I have, accordingly, provided a gauge adapted to be fitted within an opening in the top of the tank whereby the liquid level therein may readily and accurately be determined by looking through said opening, the liquid level being clearly indicated with reference to a background or scale included in the gauge. The device embodies what may be considered as a sight tube which extends vertically in the tank and around which the liquid is adapted to rise, the tube having a transparent wall inclined with respect to the surface of the liquid. An indicator or scale is mounted outside the tube and parallel to said inclined wall, and is also spaced therefrom to permit the tank liquid to enter the space between the indicator and the wall. The latter then, by virtue of its inclination, provides means for observing the liquid level with reference to said indicator by looking downward through the tube and normal to the surface of the liquid.

The invention will be understood more fully from the following detailed description of a typical embodiment thereof, reference being made throughout the description to the annexed drawing, in which:

Figure 1 is a sectional elevation through the gauge on line 1—1 of Fig. 2;

Fig. 2 is a horizontal section on line 2—2 of Fig. 1;

Fig. 3 is a vertical section on line 3—3 of Fig. 1, the top closure being removed to show the bushing construction; and Fig. 4 is a plan view of Fig. 3.

In the drawing, numeral 10 indicates the top closure of a tank within which liquid 11, for instance gasoline, is contained. A bushing 12, upon which the gauge is mounted as will later be described, is threaded into the tank at 13, the bushing being provided with an air tight cap 14 for preventing the entrance of dust particles through the gauge, and for preventing the escape of tank vapors to the atmosphere should the sight tube 20 become broken or should leakage of tank vapors occur by way of the joint J between the gauge and the bushing. The latter is provided with segmental circular and tapered lugs 12a, which are tightly engaged by pins 15, provided in the cap, to secure the cap to the bushing when it is turned thereon. A circular gasket 16 is held in place in the top of the cap by means of a retention plate 17, secured to the cap by screw 18, and serves to render the cap and bushing joint fluid tight.

A vertically extending and transparent sight tube 20, preferably of glass, is mounted on the bushing and depends a suitable distance within the tank. The tube is sealed against the entrance of the tank liquid, and obviously its interior is visible through the bushing when cap 14 is removed. Although any suitable means may be provided for mounting the tube on the bushing, I have illustrated, as preferred, a metallic strip 21, preferably of brass, extending continuously around the lower end of the tube and joined to the bushing on opposite sides thereof as at 23, said strip being spaced from the tube by means of spacers 22. The strips and spacers are held securely in place by means of a brass ring 25 extending around the outside of the strip and joined thereto by suitable means. Leakage of tank vapors around the upper end of the tube and into the bushing is prevented by means of a ring 27 threaded in the bushing, the lower edge of the ring bearing upon gasket 28 confined between the upper end of the sight tube and said ring.

As clearly shown in Fig. 2, the sight tube is shaped to provide a downwardly and inwardly inclined flat side 20a, this side being angularly disposed in relation to the liquid level L. A substantially white level indicator strip 29, preferably of celluloid, is mounted on the outside of the tube to extend parallel with and spaced from the flat side thereof, the indicator being mounted on the brass strip in any suitable manner. The use of a white celluloid strip back of the inclined wall of the sight tube has been found to be particularly satisfactory for the present purpose, although it will be understood that numerous other materials presenting a light reflecting surface may be used in its stead.

It will be seen that as the liquid in the tank rises around the sight tube, the position of the liquid level, with relation to the indicator strip 29, may be noted since the liquid has free access to space S between that strip and the tube. With the liquid level L at some point P on the indicator (see Fig. 1) the exact height of the level relative to the tank may be noted with reference to a calibrated scale on the indicator strip, by looking downwardly through the transparent inclined wall 20a. Since the inclined wall of the tube is substantially flat, the scale, as viewed therethrough appears undistorted, and therefore may be read without difficulty.

The inner surface 21c of the sight tube preferably is painted white, there being left an unpainted and transparent portion at 33, opposite the indicator strip. By thus having the liquid visible only through the unpainted portion of the tube, the liquid level appears distinct against the indicator strip, since the white interior of the tube serves to reflect light on the celluloid gauge strip, and further, since no confusing reflections are had inasmuch as the tube interior is coated except for the strip portion.

By the use of the described form of sight tube a particularly clear view of the indicator strip is had for several reasons. In the first place, substantially no light obstructing or refracting means are interposed between the top of the tank and the point at which the liquid level appears on the indicator strip, since the obstruction to view offered by the thin flat wall of the tube and the space between that wall and the indicator strip is negligible. And, furthermore, the light rays from the source of light at the top of the tube, instead of being dispersed within the entire tank interior, are confined to the tube and centered on the indicator strip. Also due to the strip being mounted fairly close to the inclined tube wall, it is possible to obtain a quick and accurate reading of the liquid level because the level mark is distinctly set out by the narrow portion of the liquid surface appearing between the tube and the indicator strip.

The invention contemplates broadly the use of any suitable gauge surface extending diagonally to the vertical within a tank, and of a suitable sight tube for viewing said gauge surface and therefore it will be understood the drawing and description are to be considered merely as illustrative of and not restrictive on the broader claims appended hereto, for various changes in design, structure and arrangement may be made without departing from the spirit and scope of said claims.

I claim:

1. A liquid level gauge for a tank embodying a bushing adapted to be mounted on the top of a tank, a vertically extending sight tube mounted on the bushing and depending within the tank, the interior of the tube being visible through the bushing and sealed against the entrance of liquid, said tube having a transparent downwardly and inwardly inclined side, a body having a light reflecting surface extending outside and parallel with said inclined side of the tube, said reflecting surface being spaced from the tube and the space therebetween being in communication with the liquid, means for supporting said body, and a removable cap for said bushing.

2. A liquid level gauge for a tank embodying a bushing adapted to be inserted in the top of the tank, a vertically extending sight tube mounted on the bushing and depending within the tank, the interior of the tube being visible through the bushing and sealed against the entance of liquid, said tube having an inwardly inclined and transparent flat side, a substantially white indicator strip mounted at the outside of the tube and extending parallel with and spaced from the flat side thereof, and means for supporting said strip, the space between the strip and tube communicating with the liquid in the tank.

3. A liquid level gauge embodying a vertically extending sight tube around which liquid is adapted to rise, the interior of the tube being visible from its upper end and sealed against the entrance of liquid, said tube having a downwardly and inwardly inclined transparent wall, a light reflecting surface outside said transparent wall and spaced therefrom, the space between the reflecting surface and said member communicating with the liquid, and the interior of the tube exclusive of said transparent wall being coated so as to appear substantially white.

4. A liquid level gauge for a tank embodying a bushing adapted to be inserted in the top of the tank, a vertically extending tube mounted on the bushing and depending within the tank, the interior of the tube being visible through the bushing and sealed against the entrance of liquid, said tube having an inwardly inclined and transparent flat side, an indicator strip mounted on the outside of the tube and extending parallel with and spaced from the flat side thereof, the space between the strip and tube communicating with the liquid in the tank, and means for mounting said strip in the gauge and for securing the sight tube to said bushing.

5. A liquid level gauge for a tank embodying a bushing adapted to be inserted in the top of the tank, a vertically extending sight tube mounted on the bushing and depending within the tank, the interior of the tube being visible through the bushing and sealed against the entrance of liquid, said tube having an inclined and transparent flat side, a tube supporting strip extending downward around the lower end of said tube and joined at its upper ends to said bushing, said strip being spaced from and extending substantially parallel with said inclined wall of the tube, and an indicator strip mounted on the inner side of said supporting strip opposite the inclined tube wall.

In witness that I claim the foregoing I have hereunto subscribed my name this 26th day of October 1928.

CHARLES F. H. BOHNHARDT.